United States Patent [19]
Burchett et al.

[11] Patent Number: 4,753,110
[45] Date of Patent: Jun. 28, 1988

[54] DYNAMOMETERS

[75] Inventors: Clive J. Burchett, Bartley; Keith T. J. Greenaway, Southhampton; Mieczyslaw F. Skrakowski, Eastleigh, all of England

[73] Assignee: Brown & Root Vickers, Ltd., London, United Kingdom

[21] Appl. No.: 43,404

[22] Filed: Apr. 28, 1987

Related U.S. Application Data

[63] Continuation-in-part of Ser. No. 883,394, Jul. 8, 1986, abandoned.

[30] Foreign Application Priority Data

Apr. 28, 1986 [GB] United Kingdom ............... 8610310

[51] Int. Cl.$^4$ ............................................. G01M 17/02
[52] U.S. Cl. ..................................... 73/146; 73/862.04
[58] Field of Search ................. 73/117, 146, 123, 126, 73/125, 127, 129, 130, 862.04, 862.54, 862.55

[56] References Cited

U.S. PATENT DOCUMENTS

| 3,590,633 | 7/1971 | Fuhrmann et al. | 73/862.04 |
| 3,780,573 | 12/1973 | Revs | 73/862.04 |
| 3,867,838 | 2/1975 | Gerresheim | 73/862.04 |
| 4,023,404 | 5/1977 | Brendel | 73/146 |
| 4,160,378 | 7/1979 | Himmler | 73/146 |
| 4,166,997 | 9/1979 | Kistler | 73/862.65 |
| 4,171,641 | 10/1979 | Landsness | 73/146 |
| 4,359,896 | 11/1982 | Brown et al. | 73/146 |

FOREIGN PATENT DOCUMENTS 2062236 5/1981 United Kingdom ............ 73/862.54

Primary Examiner—Stewart J. Levy
Assistant Examiner—Robert R. Raevis
Attorney, Agent, or Firm—Pollock, Vande Sande and Priddy

[57] ABSTRACT

A transducer head for a moving surface dynamometer comprises a casing having connections for attachment to a extremity of a support arm on a sliding carriage of a loading head of the eventual dynamometer. An axle housing in the casing supports an axle of a test subject to be spun in rolling contact with the moving surface. A multiplicity of strain transducer links are connected in load-transmitting relationship between the axle housing and the casing for supplying signals indicating tensile or compressive load therein. There are six such links in a defined pattern. Each link is advantageously threadedly attached to the axle housing and has at its outer end a male tapered threaded region that registers with a straight threaded bore in a cap attached to the casing, a tapered sleeve having external and internal threads of the same pitch being tightenable to connect the outer end of the link to the cap and thence to the housing without correspondingly straining the link.

8 Claims, 6 Drawing Sheets

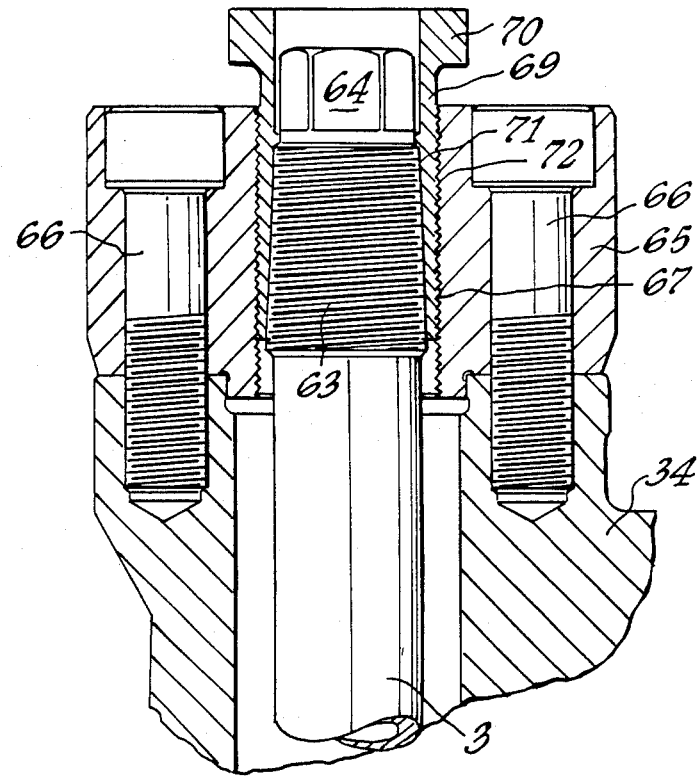
Fig. 5.
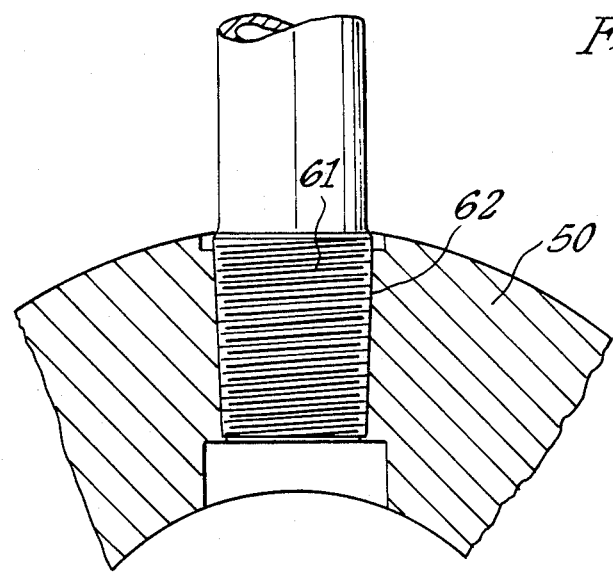

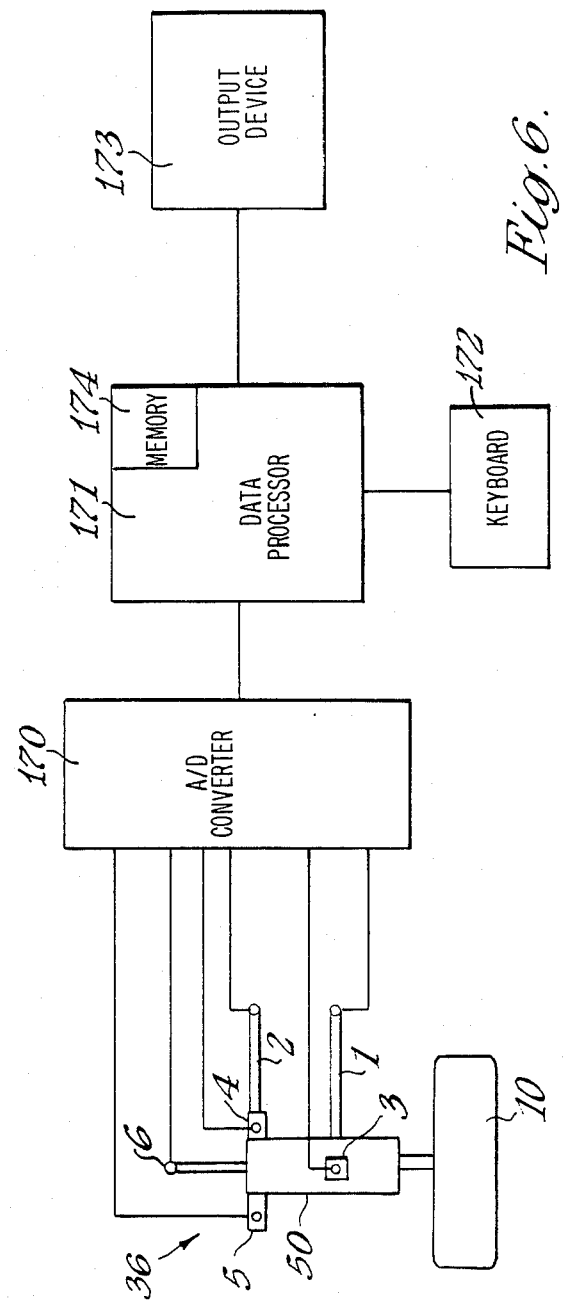
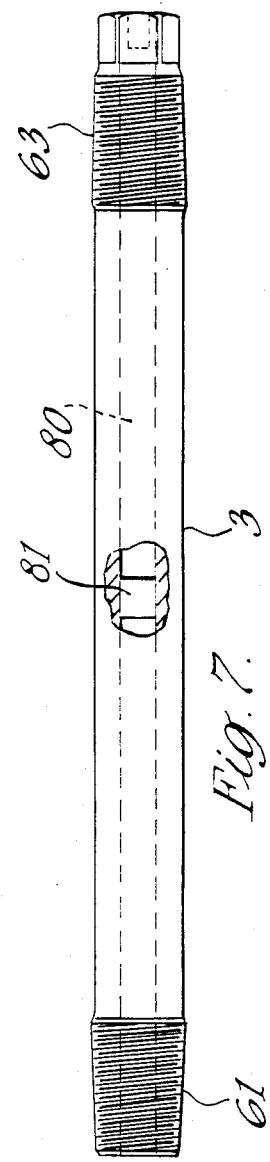
Fig. 6.
Fig. 7.

DYNAMOMETERS

RELATED APPLICATION

This application is a continuation-in-part of application Ser. No. 883,394 filed July 8, 1986, now abandoned.

FIELD OF THE INVENTION

The present invention relates to a dynamometer that is of particular advantage for the testing of tires and brakes of aircraft, though it may also be used to test other vehicle tires and brakes, and in general for monitoring the acceleration, deceleration or energy tolerance of any moving device intended to be coupled to a vehicle.

BACKGROUND TO THE INVENTION

The use of a so-called "chassis dynamometer" with inertial weights to measure the acceleration and deceleration performance of an automobile or other vehicle has long been known (see Knudsen R. F., "Inertia Electronically", ISA Journal, April 1958, Vol. 5. No. 4, PP 52–54). Further dynamometers are described in Patent Specification Nos. GB-A-1297813, 1604320 and 2149520, U.S. Pat. Nos. 3,590,633, 3,780,573 and 4,359,896 and in Roberts J. B., "An Advanced High-Speed Dynamometer for Testing Aircraft Tyres, Wheels and Brakes", read before the Applied Mechanics Group of the Institution of Mechanical Engineers on 10 Apr. 1974.

In a conventional dynamometer such as that described by Roberts supra the forces on the tire, wheel and brake under test are measured by load cells attached in the load path from hydraulic ram means of the loading head and a sliding carriage thereof. This invention is concerned with the problem of improving the accuracy with which loads and moments on the test subject can be determined and of enabling corresponding loads and moments in the group plane to be determined. It is further concerned with providing such a system in which loads in and moments about the spin axis and a pair of orthogonal axes are determined.

SUMMARY OF THE INVENTION

In one aspect the invention provides a transducer head for a dynamometer comprising casing means having connections for eventual attachment to an extremity of a support arm on sliding carriage means of a loading head of the eventual dynamometer, axle housing means in the casing for supporting an axle of an eventual test subject to be spun by rolling contact with the moving surface of the eventual dynamometer, and first to sixth strain transducer link means connected in load transmitting relationship between the axle housing means and the casing means for supplying signals indicating tensile, compressive or shear load therein, wherein:

the first and second link means are parallel, are attached to the axle housing means at positions remote from the intended dynamometer moving surface, are spaced apart along the axle housing means and are directed normal to the spin axis;

parallel third, fourth and fifth link means located to the same side of the axle housing means as one another are directed normal both to the first and second link means and to the spin axis, with the third link means directed so as to intersect the spin axis and the fourth and fifth link means offset to opposite sides of the spin axis and connected to lateral extensions of the axle housing means; and the sixth link means is directed along the spin axis.

The above arrangement of link means has the advantage that the links measuring brake torque are orthogonal to the links that measure radial load.

In a further aspect the invention provides a dynamometer having a loading head provided with a sliding carriage having a support arm to a tip of which is attached a transducer head as aforesaid.

In a yet further aspect the invention provides the combination of a dynamometer as aforesaid with data processing means containing stored instructions for transposing measured loads and moments at a wheel axis to the ground plane.

BRIEF DESCRIPTION OF THE DRAWINGS

An embodiment of the invention will now be described, by way of example only, with reference to the accompanying drawings, in which:

FIG. 5 is a diagram illustrating the fitting of a transducer link between an axle housing and a casing of the transducer head of FIG. 3;

FIG. 6 is a block diagram of a computer for processing data from the loading head of FIG. 4; and FIG. 7 is a diagrammatic section of a transducer link that forms part of the transducer head of FIG. 4.

DETAILED DESCRIPTION OF PREFERRED EMBODIMENT

Figure 1:
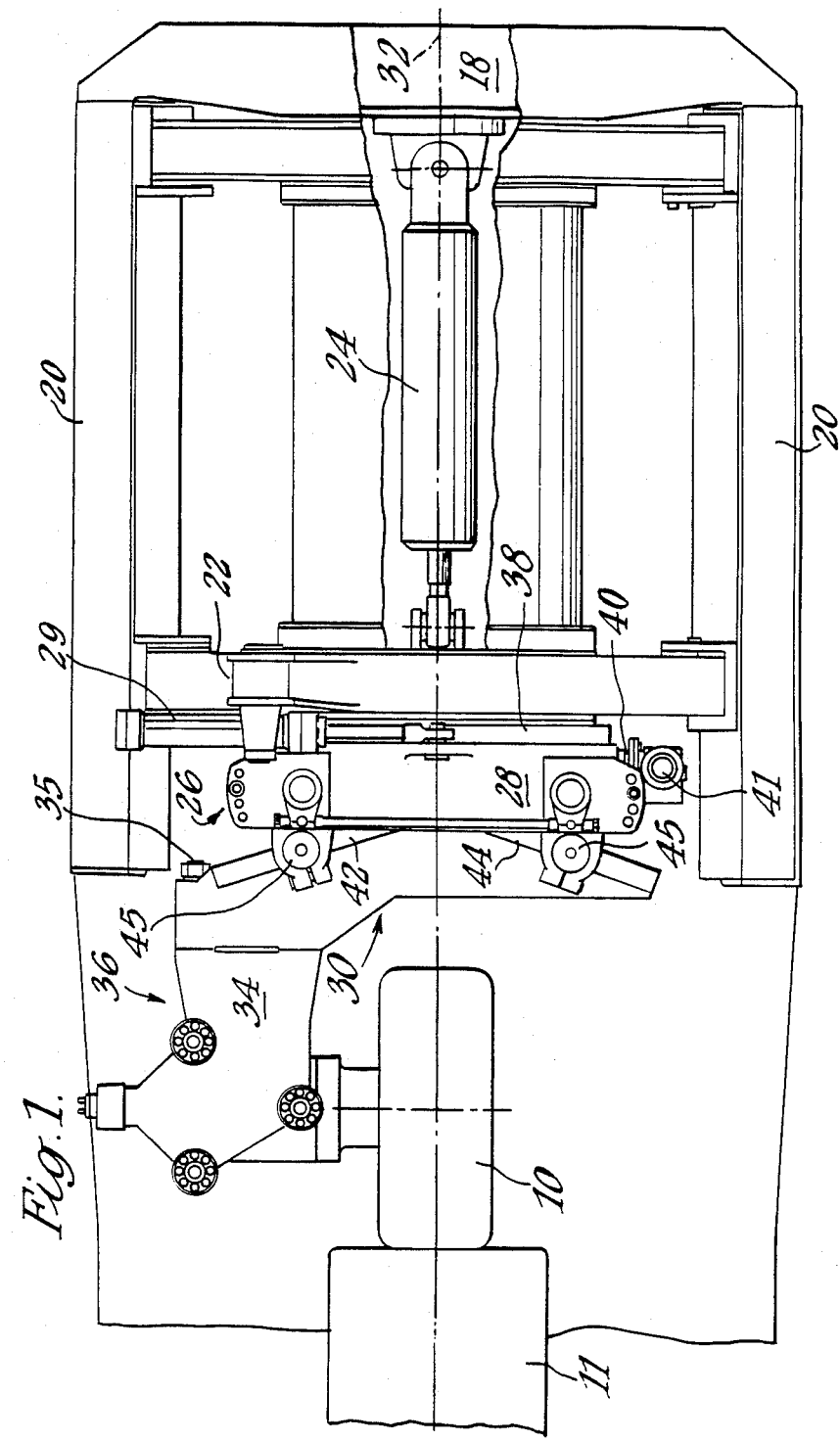
FIGS. 1 and 2 are views in plan and in side elevation of a loading head forming part of a dynamometer for testing aircraft tires and/or wheels and brakes.
Figure 2:
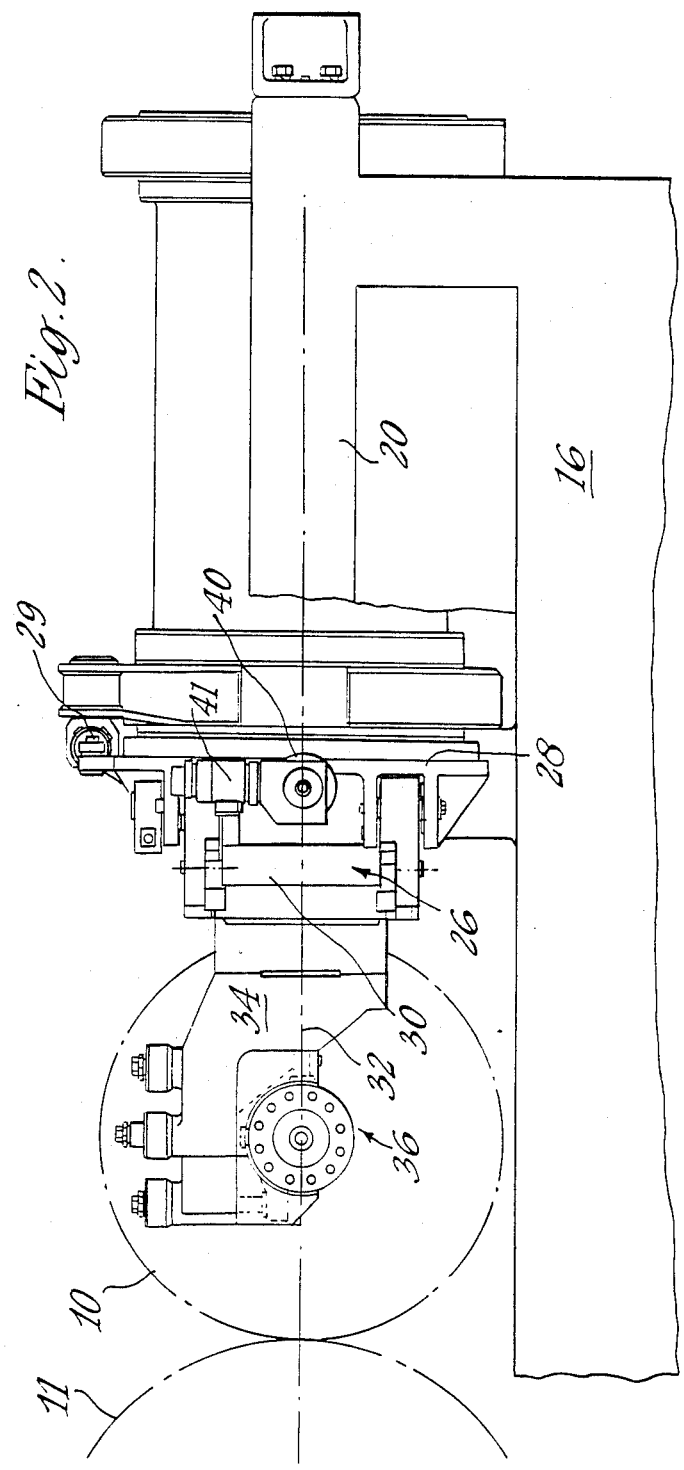

In FIGS. 1 and 2, a loading carriage is shown that forms part of a dynamometer for testing tires and/or wheels and brakes of aircraft with a runway being simulated by the surface of a large rotatable drum 11 (FIG. 3) with which a tire 10 of a tire wheel and brake assembly is maintained in rolling contact. The tire 10 makes a footprint 12 (FIG. 4) on the drum 11 with a ground plane 14 (FIG. 3) that corresponds to the runway over which an aircraft tire rolls being generated by a surface tangential to drum 11 at the effective contact point 15 of tire 10, the drum 11 being substantially larger than the tire 10 so that its curved surface from a behavioral standpoint sufficiently approximates to flatness.

A bed 16 supports a frame structure 18 including lateral guideways 20 that act as linear bearings for a travelling carriage 22 which may be advanced towards the drum by ram 24. A connector assembly generally indicated by the reference numeral 26 comprises a fixed portion defined by bracket 28 attached to a front face of the travelling carriage 22 and a mounting plate 30 constituting a movable portion. The plate 30 forms one limb of a cantilever arm assembly and is directed normal to and extends across a line of action 32 of the loading head. The front face of plate 30 carries a transducer head, generally designated by the reference numeral 36, whose casing 34 is directed parallel to but is spaced from the line of action 32 and which constitutes a second limb of the cantilever arm assembly.

The plate 30 is supported by the bracket 28 which is provided with bearing members (not shown) against which the back surface of plate 30 lies and that serves to transmit load from the bracket 28 to the plate 30. The bracket 28 is supported by a bearing 38 from the travelling carriage 22, which bearing 38 allows the bracket 28 to rotate about the line of action 32 relative to carriage 22 to set an intended yaw angle $\theta$ (FIG. 3) of tire 10 relative to the dynamometer drum 11, there being locking means (not shown) for maintaining the intended yaw angle $\theta$. A ram 29 pivoted between bracket 28 and the carriage 22 is used to set the yaw angle. Camber angle $\phi$ (FIG. 3) of the tyre 10 is set by moving the plate 30 transversely of the bracket 28 by means of lead screw 40 supported on bearings in bracket 28 and driven by motor 41. A travelling nut on lead screw 40 is pivoted in a bracket structure attached to the back face of plate 30 and moves along the screw 40. The plate 30 carries, on its upper and lower faces, pairs of first and second straight tracks 42, 44 to opposed sides of the line of action 32 and directed at an angle to one another. The angle between the tracks 42, 44 is determined in accordance with geometrical requirements to enable the plate 30 to be cambered relative to the carriage 22 and bracket 28, and during this operation (which is brought about by rotation of the lead screw 40) the tracks 42, 44 slide through bushes 45. Advantageously the spacing between bushes 45 and the line of action 32 is adjustable so that the point of contact between the tire 10 and the dynamometer drum is maintained at a datum position as described and claimed in British Patent Application No. 8610312 filed 28th Apr. 1986, the disclosure of which is incorporated herein by reference.

Figure 3:
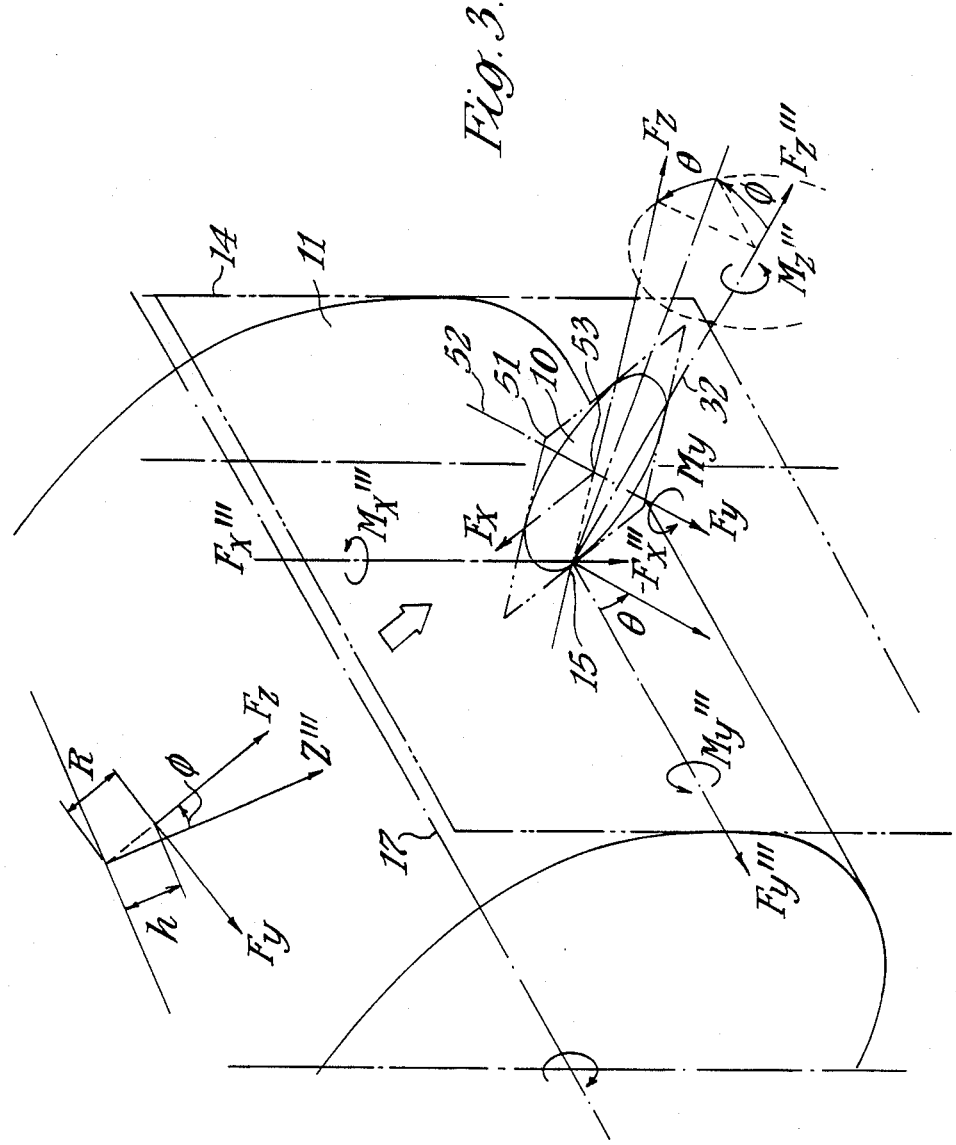
FIG. 3 is a diagram showing forces and moments generated by a wheel rotating in contact with a drum at the wheel plane and at a ground plane.
Figure 4:
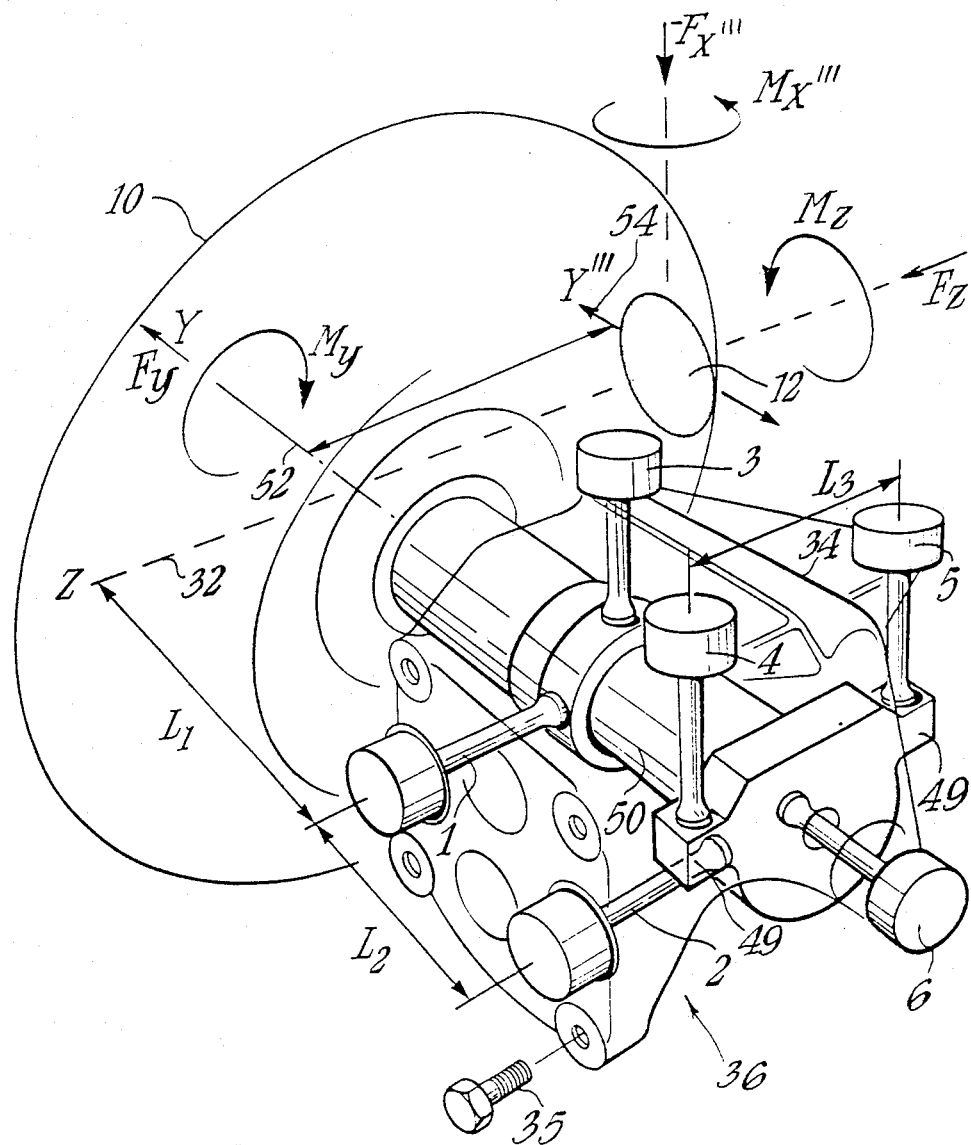
FIG. 4 is a diagrammatic perspective view of a transducer head forming part of a cantilever arm assembly of the loading head of FIGS. 1 and 2.

In FIG. 3 the forces and moments at a plane 51 of the wheel 10 rotating in contact with drum 11 are shown at camber angle $\phi$ and yaw angle $\theta$. An origin of cartesian coordinates is defined by a point 53 where the spin axis 52 of wheel 10 intersects wheel plane 51. The wheel spin axis 52 defines a Y axis. A line joining the point 53 to a tire contact point 15 defines a Z axis and an orthogonal line through the point 53 defines an X axis. If equivalent coordinates are taken through the tire contact point 15, the line of action 32 defines a z''' axis, a line through point 15 parallel to the spin axis 17 of drum 11 defines a y''' axis and an orthogonal line through the point 15 and in the ground plane 14 defines an X''' axis. The symbol x''', for example, means that axis is related to the x axis by two rotations and a translation.

In or about the spin axis 52 there is experienced a side force $F_y$ and a brake torque $M_y$ and there is a related cornering force $F_y'''$ and rolling resistance moment $M_y'''$ in or about the y''' axis. In or about the Z axis there is present a radial load $F_z$ and an aligning torque $M_z$ which are related to a thrust of the loading head $F_z'''$ and a self-aligning torque $M_z'''$ about the line of action 32. In or about the orthogonal axis there is a force $F_x$ and an overturning moment $M_x$ which relate to a corresponding drag force $-F_x'''$ and $M_x'''$ at the ground plane 14.

The transducer head 36 enables accurate and rapid measurements to be made of the forces $F_x$, $F_y$ and $F_z$ and the corresponding moments $M_x$, $M_y$, $M_z$ by supporting a floating axle hub 50 for the wheel 10 by means of links along three orthogonal directions joining the hub 50 to the casing 34, with one of the links 6 lying along the spin axis 52. Advantageously there are six links, and each of them is a hollow strain-gauged transducer pin with the gauges so positioned relative to a neutral axis of the pin as to respond only to tensile and compressive loads and substantially not to torsional or shear loads. The links are desirably disposed so as to minimize cross-talk and simplify the processing of the information resulting therefrom. Links 1 and 2 lie in a common plane defined by the Y and Z axis. The link 1 is spaced a distance $L_1$ from the plane of the wheel 10 and is fastened to the hub 50 at a position partway along its length. The link 2 is located towards an end of the hub 50 remote from the wheel 10 a distance $L_2$ from the link 1. Link 6 is connected to the end of the hub 50 furthest from the wheel 10. Links 3, 4 and 5 are directed along the orthogonal axis and are disposed at the vertices of an isosceles triangle with links 4 and 5 connected to ears 49 on the end of the hub 50 furthest from the wheel 10 at a distance $L_3$ apart and with the link 3 being connected to the hub 50 partway along its length at the same axial position as the link 1. The ends of links 3, 4 and 5 lie in a common plane parallel to but offset along the X axis from the spin axis 52.

Radial load $F_z$ is defined as a force parallel to the Z axis which in the uncambered attitude of wheel 10 is normal to the ground plane 14. Application of this load results in compression of link 1 and tension in link 2, the loads in links 3 to 6 not being significant. Radial load $F_z$ is theoretically, in the absence of cross-coupling, the algebraic sum of the forces in links 1 and 2. Aligning torque $M_z$ is defined as the moment about the Z axis and generation of this moment in the direction indicated will produce compression in links 4 and 5 and tension in link 3, the loads in links 1, 2 and 6 not being significant. The generated moment $M_z$ may be derived theoretically knowing the fixed lengths $L_1$ and $L_2$ as the algebraic sum of $L_1$ times the load in link 3 plus $(L_1+L_2)$ times the sum of the loads in links 4 and 5. In the Y axis the side force $F_y$ produces a tension or a compression in link 6. The side force $F_y$ may be derived theoretically by measuring the load in link 6, links 1, 2, 3, 4 and 5 not being significantly loaded. The brake torque $M_y$ is carried by forces of equal magnitude but opposite direction in links 4 and 5 and is the sum of the load in link 4 times $L_{3/2}$ and the load in link 5 times $L_{3/2}$. The drag force $F_x$ produces a tension in link 3 and an equal compression in links 4 and 5 and it is given theoretically by the algebraic sum of the loads in those links. The overturning moment $M_x$ is the sum of $L_1$ times the load in link 1 plus $(L_1+L_2)$ times the load in link 2.

The voltage outputs from links 1 to 6 of the transducer head 36 are analogue and are converted to digital values by an analogue to digital converter means 170 (FIG. 6) and processed by an associated digital computer to give the three mutually perpendicular forces and moments $F_x$, $F_y$, $F_z$ and $M_x$, $M_y$, $M_z$. The transducer head 36 is assumed to behave linearly and its output signals are absolute and therefore the weight of the tire wheel and brake assembly needs to be taken into account when determining the forces and moments generated during the tire, wheel and brake testing routines. When there is no yaw $\theta$ but some camber $\phi$ the weight of the tire wheel and brake assembly affects the measured value of $F_x$ only, but when the wheel assembly is yawed its weight affects the measured values of both $F_x$ and $F_y$. The weight of the tire wheel and brake assembly is therefore measured by transducer head 36 at the start of the test and stored, and corrected values of $F_x$ and $F_y$ are calculated by digital data processor 171 responsive to the output of the converter means 170 using this stored data together with the yaw angle $\theta$. The yaw angle $\theta$ can change continuously so that this calculation is desirably executed in real time. The data processor 171 is provided with keyboard input means 172 for entry of instructions, and with output peripheral device means 173 which may be a printer or visual display unit for displaying the results of calculations.

A program for executing the calculations described below is stored in memory 174 of the computer 171.

The values obtained at this stage are linearized forces and moments in the wheel plane (x, y, z axes). The values must be transformed to the ground plane 12 at the contact point 15. This involves one translational and two rotational transpositions. The real time inputs required are $\theta$, $\phi$ and h, the axle height.

The nature of the system is such that due to the effects of "cross-talk" the stress in each link 1 to 6 is a function of each of the three mutually perpendicular forces and moments.

Mathematically, this is represented as follows:

$$V_1 = a_{11}F_x + a_{12}F_y + \ldots + a_{16}M_z$$
$$V_6 = a_{61}F_x + a_{62}F_y + \ldots + a_{66}M_z \tag{1}$$

In matrix form this can be written as follows:

$$[V] = [A][F,M] \tag{2}$$

where V represents the output voltage, [A] is a matrix which remains constant over the whole range of loads and F and M represent the forces and moments. It thus follows that if the inverse of $[A]$ $([A]^{-1} = [B])$ is found, the following is true:

$$[F,M] = [B][V] \tag{3}$$

Matrix [A] can be inverted only if it satisfies the following conditions:
the matrix [A] must be non-singular; ie. $|A| \neq 0$
the matrix [A] must be square; ie. $5 \times 5$, $6 \times 6$, $7 \times 7$ etc.

The above equation allows forces at the wheel origin to be calculated. These can be transposed to give the forces and moments at the nominal center (15) of the ground plane (12).

The three dimensional coordinate reference frames are right handed cartesian coordinate frames. All translational and rotational motions are in accordance with the right hand corkscrew rule.

Thus translation of the reference frame x, y, z to a new reference frame x', y', z', generates the following equations:

$$\begin{bmatrix} F_{x'} \\ F_{y'} \\ F_{z'} \\ M_{x'} \\ M_{y'} \\ M_{z'} \end{bmatrix} = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & -z & y & 1 & 0 & 0 \\ z & 0 & -x & 0 & 1 & 0 \\ -y & x & 0 & 0 & 0 & 1 \end{bmatrix} \times \begin{bmatrix} F_x \\ F_y \\ F_z \\ M_x \\ M_y \\ M_z \end{bmatrix} \tag{4}$$

Rotation about the x' axis through camber angle $\phi$ rotates the reference frame x', y', z' to a new reference frame x", y", z" and generates the following equations:

$$\begin{bmatrix} F_{x''} \\ F_{y''} \\ F_{z''} \\ M_{x''} \\ M_{y''} \\ M_{z''} \end{bmatrix} = \begin{bmatrix} 1 & 0 & 0 & 0 & 0 & 0 \\ 0 & \cos\phi & -\sin\phi & 0 & 0 & 0 \\ 0 & \sin\phi & \cos\phi & 0 & 0 & 0 \\ 0 & 0 & 0 & 1 & 0 & 0 \\ 0 & 0 & 0 & 0 & \cos\phi & -\sin\phi \\ 0 & 0 & 0 & 0 & \sin\phi & \cos\phi \end{bmatrix} \times \begin{bmatrix} F_{x'} \\ F_{y'} \\ F_{z'} \\ M_{x'} \\ M_{y'} \\ M_{z'} \end{bmatrix} \tag{5}$$

Rotating about the Z" axis through yaw angle $\theta$ transforms the reference frame x", y", z" to another new reference frame x''', y''', z''' and generates the following equation:

$$\begin{bmatrix} F_{x'''} \\ F_{y'''} \\ F_{z'''} \\ M_{x'''} \\ M_{y'''} \\ M_{z'''} \end{bmatrix} = \begin{bmatrix} \cos\theta & -\sin\theta & 0 & 0 & 0 & 0 \\ \sin\theta & \cos\theta & 0 & 0 & 0 & 0 \\ 0 & 0 & 1 & 0 & 0 & 0 \\ 0 & 0 & 0 & \cos\theta & -\sin\theta & 0 \\ 0 & 0 & 0 & \sin\theta & \cos\theta & 0 \\ 0 & 0 & 0 & 0 & 0 & 1 \end{bmatrix} \times \begin{bmatrix} F_{x''} \\ F_{y''} \\ F_{z''} \\ M_{x''} \\ M_{y''} \\ M_{z''} \end{bmatrix} \tag{6}$$

When transposing from the wheel center to the ground plane center, the order in which the transformations must be made are:

Translate—Camber—Yaw

The translation is effected in the z axis only Thus:

$$x = 0$$

$$y = 0$$

$$z = R = h/\cos\phi \text{ where h is measured axle height along the Z''' axis.}$$

The equations which calculate forces at the ground plane center from forces measured at the wheel center are derived by multiplying out the following matrices:

$$[F,M]_{GP} = [\theta][\phi][Z][F,M]_{WP} \tag{7}$$

where $\phi$ is the camber angle, $\theta$ represents the yaw angle and z represents the translation from spin axis to ground plane. The following matrix represents the results of the three successive transpositions and relates forces in the wheel plane or at the spin axis to forces at the ground plane.

$$\begin{bmatrix} F_{x'''} \\ F_{y'''} \\ F_{z'''} \\ M_{x'''} \\ M_{y'''} \\ M_{z'''} \end{bmatrix}_{GP} = \begin{bmatrix} \cos\theta & -\sin\theta\cos\phi & \sin\theta\sin\phi & 0 & 0 & 0 \\ \sin\theta & \cos\theta\cos\phi & -\cos\theta\sin\phi & 0 & 0 & 0 \\ 0 & \sin\phi & \cos\phi & 0 & 0 & 0 \\ -h\sin\theta & -h\cos\theta/\cos\phi & 0 & \cos\theta & -\sin\theta\cos\phi & \sin\theta\sin\phi \\ h\cos\theta & -h\sin\theta/\cos\phi & 0 & \sin\theta & \cos\theta\cos\phi & -\cos\theta\sin\phi \\ h\tan\phi & 0 & 0 & 0 & \sin\phi & \cos\phi \end{bmatrix} \times \begin{bmatrix} F_x \\ F_y \\ F_z \\ M_x \\ M_y \\ M_z \end{bmatrix}_{WP} \quad (8)$$

$\theta$ = Yaw Angle
$\phi$ = Camber Angle
$h$ = Axle Height

The voltage output from each of the load cells is proportional to the direct stress in each of the load cells.

A calibration procedure can be established to obtain a calibration matrix [C] for the GPFMS head. This matrix relates the six GPFMS link outputs to the set of six wheel plane forces ($F_x$, $F_y$, $F_z$, $M_x$, $M_y$, and $M_z$). Thus:

$$\begin{bmatrix} F_x \\ F_y \\ F_z \\ M_x \\ M_y \\ M_z \end{bmatrix} = [C] \begin{bmatrix} V_1 \\ V_2 \\ V_3 \\ V_4 \\ V_5 \\ V_6 \end{bmatrix} \quad (9)$$

where
$V_1 \rightarrow V_6$ = link voltages
[C] = calibration matrix

The logged data of the calibration load configurations are processed by calibration computer software to obtain [C] by the following steps.

Step (1): For each calibration load configuration in turn perform a linear regression least squares line fit of the logged link voltage (V) versus reference load cell force (P) for each of the 6 GPFMS links. The GPFMS head relationship is assumed to be linear as below although a polynomial form could be used.

$$V = mP + k \quad (10)$$

where
V = link voltage
P = reference cell load
m = slope of least squares line
k = link voltage corresponding to zero load Step (2): A data set, comprising all results chosen from the calibration load sets, is then processed, using a least squares multiple regression procedure, to produce a system of six linear equations for each force and moment in the wheel plane. The multiple regression equation used is:

$$F_{wp} = C_1 V_1 + C_2 V_2 + C_3 V_3 + C_4 V_4 + C_5 V_5 + C_6 V_6 \quad (11)$$

where
C: are the calibration matrix coefficients relating link voltages to each wheel plane component $F_{wp}$, and
$F_{wp}$ is the selected wheel plane component from the set $F_x$, $F_y$, $F_z$, $M_x$, $M_y$, $M_z$.

The procedure yields a total system of six sets of six linear equations. These are processed simultaneously using matrix techniques and solved using the equation:

$$[C] = [FV][VV]^{-1} \quad (12)$$

where:
[C] is the calibration matrix
[FV] is the matrix of summation coefficients relating force and link data streams
[VV] is the matrix of summation coefficients relating each link data stream to itself and to each other link data stream
[FV] and [VV] are derived from the least squares multiple linear regression procedure.

Step (3): Having obtained [C] at step 2 the GPFMS link output can be converted to WHEEL PLANE FORCES from:

$$\begin{bmatrix} F_x \\ F_y \\ F_z \\ M_x \\ M_y \\ M_z \end{bmatrix} = [C] \begin{bmatrix} V_1 \\ V_2 \\ V_3 \\ V_4 \\ V_5 \\ V_6 \end{bmatrix} \quad (13)$$

Step (4): Using the relationship obtained at step 3, load patterns including other than the calibration configurations, can be used to verify the GPFMS head output forces. These output forces are compared to the sets of known applied wheel plane forces.

The values of the wheel forces and moments include the weight of the tire wheel and brake assembly and the GPFMS. The weight of the GPFMS and the axle/wheel/tire assembly will have an effect on the measured force. These effects will vary with both camber and yaw angles. The displacement of wheel plane center to ground plane centre will also effect the ground plane forces.

During calibration the weight effect is eliminated by zeroing the system before loads are applied. The results are therefore based on changes in force at the wheel center.

The effective mass will include part of the links, the hub, axle, wheel and tire assembly. Taking the weight of this mass as W and the coordinates of its center of gravity, in the wheel plane, as x, y and z, the forces and moments at the wheel center are:

$$F_x = -W \cos\theta \quad (14)$$

$$F_y = W \sin\theta \cos\phi \quad (15)$$

$$F_z = -W \sin\theta \sin\phi \quad (16)$$

$$M_x = -W \sin\theta (z \cos\phi + y \sin\phi) \quad (17)$$

$$M_y = -W(z \cos \theta - x \sin \theta \sin \phi) \quad (18)$$

$$M_z = W(x \sin \theta \cos \phi + y \cos \theta) \quad (19)$$

At the Ground Plane Center they are:

$$F_x = -W \quad (20)$$

$$F_y = 0 \quad (21)$$

$$F_z = 0 \quad (22)$$

$$M_x = 0 \quad (23)$$

$$M_y = -W[y \sin \phi + (R+z) \cos \phi] \quad (24)$$

$$M_z = W[x \sin \theta + y \cos \theta \cos \phi - (R+z) \sin \phi \cos \theta] \quad (25)$$

If the system is set to zero when the axle/wheel/tire assembly is fitted and with zero yaw and camber, the indicated readings, at wheel plane, due to weight become:

$$F_x = W(1 - \cos \theta) \quad (26)$$

$$F_y = W \cos \phi \sin \theta \quad (27)$$

$$F_z = -W \sin \phi \sin \theta \quad (28)$$

$$M_x = -W \sin \theta (z \cos \phi + y \sin \phi) \quad (29)$$

$$M_y = W[z(1 - \cos \theta) + x \sin \theta \sin \phi] \quad (30)$$

$$M_z = W[x \sin \theta \cos \phi - y(1 - \cos \phi)] \quad (31)$$

These values should be subtracted from the actual readings during tests before being translated to the Ground Plane.

Although there are six equations with four unknowns, the equations are not independent. Therefore to evaluate the values two sets of results at different camber and yaw angles are required.

FIG. 5 represents diagrammatically the way that the link 3 is fitted between the hub 50 and the casing 34. At its inner end the link 3 is formed with a male conical threaded formation 61 that mates into a corresponding threaded socket 62 in the hub 50. At its outer end the link 3 is formed with a second male conical threaded formation 63 and a hexagonal head formation 64 which enables the link to be tightened in the hub socket 62 to the appropriate torque. In FIG. 7, the link 3 can be seen to have an internal bore 80 on the surface of which are adhered one or more pairs of opposed strain gauge elements 81 as known in the art, elements 81 being symmetrically disposed with respect to the axis of the element 80 so that strain resulting from bending can be minimized and a tensile or compressive signal obtained. Referring again to FIG. 5, a cap 65 is fastened by bolts 66 to the casing 34 and has a straight threaded bore 67. A sleeve 69 has a hexagonal head 70 by which it may be tightened, a female tapered internal threaded region 71 that mates with the formation 63 and a straight external threaded region 72 that mates with the bore 67. The pitch of the internal and external threads of regions 71, 72 is the same so that the sleeve 69 can be tightened to clamp the link 3 in load transmitting relationship to the casing 34 and to pre-load the threads so that bending loads are resisted without inducing significant load in the link 3. The remaining links 1, 2, 4, 5 and 6 are fitted to the hub 50 and casing 34 in the same manner as the link 3. The links 1 to 6 define a redundant structure in which there are six primary load paths between hub 50 and casing 34 when a force is applied, and the direction of the applied force determines the main load paths. The stresses in the load cells forming the alternative load paths are predominantly those due to shear which causes link bending and, as mentioned above, bending stress can be minimized from the measurement system by proper siting of the strain gauges relative to the neutral axis and by simple logic so that the major direct stress component is output.

It will be appreciated that relocation of the strain gauge elements in a transducer head near the end of the centilever arm enables more direct and accurate measurement of load on the test assembly to be made because the gauges are sited nearer the wheel and there are no intervening massive components such as a travelling carriage and support brackets on the face thereof. Measurement is made in a plane that excludes the inertial mass of the yaw and camber mechanisms. Accordingly since the force measuring unit is near the wheel spin axis and not at a remote plane, the sensitivity of the unit is increased, particularly for transient vibrational loadings enabling better dynamic response, more rapid sampling and better dynamic analysis of the assemblies allowing better understanding of the type wheel and brake behavior patterns. The provision of the transducer head 36 as a separate module releasably held in place by bolts 35 enables a range of interchangeable transducer heads to cater for different test conditions and ranges of measured components. Individual links may also be changed to accommodate different ranges if necessary. Calibration of the transducer head may take place in situ on the machine using a purpose designed rig and accompanying procedures, or off the machine in a calibration rig.

The easy conversion of test assembly loads and moments in the ground plane is further significant benefit. It will be appreciated that modifications may be made to the embodiment described above without departing from the invention the scope of which is defined in the appended claims. For example, the test subject may be supported in full fork configuration rather than in the illustrated half fork configuration.

We claim:

1. A transducer head for a moving surface dynamometer having a loading head, said transducer head comprising casing means having connecting means for attachment to the loading head of the dynamometer, axle housing means in the casing means for supporting an axle of a rotatable test subject, said axle having a spin axis and first to sixth strain transducer link means connected in load transmitting relationship between the axle housing means and the casing means for supplying signals indicating tensile, compressive or shear load therein, wherein:

the first and second link means are parallel, are attached to the axle housing means, extend from the axle housing means in the direction of the connecting means, are spaced apart along the axle housing means and are directed normal to the spin axis;

parallel third, fourth and fifth link means located to the same side of the axle housing means as one another are directed normal both to the first and second link means and to the spin axis, with the third link means directed so as to intersect the spin axis and the fourth and fifth link means offset to opposite sides of the spin axis and connected to lateral extensions of the axle housing means; and the sixth link means is directed along or parallel to the spin axis.

2. A transducer head according to claim 1, wherein the third link means is nearer to the test subject and lies in the same radial plane as the first link means, and the fourth and fifth link means are further from the test subject and lie in the same radial plane as the second link means.

3. A transducer head according to claim 1, wherein each link means is threadedly attached at an inner end to the axle housing means and at an outer end to the casing means.

4. A transducer head according to claim 3, wherein an outer end of the link means has a male tapered threaded region that registers with a straight threaded bore in cap means attached to the casing means, and a sleeve means has external thread means that engages the bore and tapered internal thread means that engages the male threaded region, the pitch of the internal and external thread means of the sleeve means being the same so that the sleeve means can be tightened to connect the link means to the casing while inducing negligible strain in the link means.

5. A moving surface dynamometer having a rotatory drum, a loading head, a frame structure, a carriage forming part of the loading head that slides relative to the frame structure towards and away from the drum, a plate attached to the carriage and facing the drum, and a transducer head as claimed in claim 1 attached to the plate.

6. A dynamometer according to claim 5 wherein the test subject includes a wheel to be spun by rolling contact with the surface of the drum, and further comprising first means connected between the sliding carriage and the plate for setting a yaw angle of the wheel relative to the drum.

7. A dynamometer according to claim 6, further comprising second means connected between the sliding carriage and the plate for setting a camber angle of the wheel relative to the drum.

8. A dynamometer as claimed in claim 7, further comprising data processing means containing stored instructions for transposing measured loads and moments at the wheel plane to the ground plane, said instructions including a predetermined calibration matrix relating the outputs of said first to sixth link means to a set of three mutually perpendicular wheel plane forces and moments $F_x$, $F_y$, $F_z$, $M_x$, $M_y$ and $M_z$.

* * * * *